(12) United States Patent
Duggan

(10) Patent No.: US 8,429,475 B2
(45) Date of Patent: Apr. 23, 2013

(54) STATE DEPENDENT ADVANCED RECEIVER PROCESSING IN A WIRELESS MOBILE DEVICE

(75) Inventor: Jason Robert Duggan, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 505 days.

(21) Appl. No.: 12/714,050

(22) Filed: Feb. 26, 2010

(65) Prior Publication Data
US 2010/0223522 A1 Sep. 2, 2010

Related U.S. Application Data

(63) Continuation-in-part of application No. 12/394,162, filed on Feb. 27, 2009.

(51) Int. Cl.
*G08C 25/02* (2006.01)
*H03M 13/00* (2006.01)

(52) U.S. Cl.
USPC .......................................... 714/748; 714/776

(58) Field of Classification Search .................. 714/748, 714/749, 750, 755, 801, 776, 758, 786, 746, 714/752, 751, 795
See application file for complete search history.

(56) References Cited

U.S. PATENT DOCUMENTS

| | | | | |
|---|---|---|---|---|
| 5,157,672 A * | 10/1992 | Kondou et al. | | 714/795 |
| 5,815,507 A * | 9/1998 | Vinggaard et al. | | 714/704 |
| 6,724,555 B2 * | 4/2004 | Ohta | | 360/65 |
| 6,879,267 B2 * | 4/2005 | Yamazaki | | 341/64 |
| 8,064,394 B2 * | 11/2011 | Jongren et al. | | 370/329 |
| 8,116,394 B2 * | 2/2012 | Jia | | 375/260 |
| 8,145,974 B2 * | 3/2012 | Shen et al. | | 714/755 |
| 8,290,441 B2 * | 10/2012 | Kurapati et al. | | 455/67.11 |
| 2003/0053435 A1 | 3/2003 | Sindhushayana | | |
| 2004/0057530 A1 | 3/2004 | Tarokh et al. | | |
| 2006/0009177 A1 | 1/2006 | Persico et al. | | |
| 2006/0047857 A1 | 3/2006 | Dabiri et al. | | |
| 2007/0184811 A1 | 8/2007 | Ballantyne | | |
| 2008/0207131 A1 | 8/2008 | Coersmeier | | |
| 2010/0004015 A1 * | 1/2010 | Nilsson et al. | | 455/522 |

FOREIGN PATENT DOCUMENTS

| | | |
|---|---|---|
| EP | 1 672 812 | 6/2006 |
| EP | 1672812 A1 | 6/2006 |

OTHER PUBLICATIONS

Extended European Search Report for European Patent Application EP 10 154 926.9 dated Aug. 26, 2010 (11 pages).
European Extended search report for corresponding EP application dated Aug. 26, 2010.

* cited by examiner

*Primary Examiner* — Phung M Chung

(57) ABSTRACT

A method for receiver processing in a 3GPP Long Term Evolution (LTE) receiver processing chain in a wireless mobile device is provided. LTE initial sub-frame transmitted from a base station is received on a LTE signalling channel. The sub-frame is received using a basic receiver. An integrity check is performed to determine if the sub-frame was demodulated and decoded correctly by the basic receiver. An advanced receiver is enabled prior to receiving an expected retransmission sub-frame based upon the integrity check failing and a hybrid-acknowledgement request (HARQ) negative acknowledgement (NAK) being sent by the wireless mobile device. The retransmission sub-frame is received using the advanced receiver. The basic receiver is enabled when the integrity check of the retransmission sub-frame passes and a acknowledgement (ACK) is by the wireless mobile device or a new data indicator (NDI) is set in a control channel indicating that the transmission is an initial transmission.

21 Claims, 10 Drawing Sheets

STATE DEPENDENT ADVANCED RECEIVER PROCESSING IN A WIRELESS MOBILE DEVICE

CROSS-REFERENCE TO RELATED APPLICATIONS

This application claims priority from U.S. patent application Ser. No. 12/394,162 filed Feb. 27, 2009, which is herein incorporated by reference.

TECHNICAL FIELD

The present disclosure relates to wireless mobile networks and in particular to a radio frequency receiver of a long-term evolution (LTE) wireless mobile device.

BACKGROUND

In broadband wireless communication systems such as 3GPP Long-Term Evolution (LTE) wireless networks the design of wireless mobile devices is a trade-off between performance and battery life. The receivers implemented in wireless mobile device provide adequate performance for typical radio frequency (RF) propagation conditions. However there are situations where RF performance is sub-optimal resulting in failures of the link between the wireless mobile device and the base station. There is always a tradeoff between link performance (being able to successfully decode the transmission from the base station) and power dissipation which directly corresponds to battery life. It is possible to choose very complex algorithms to process the signal that yield better link performance but also lead to higher power dissipation.

LTE systems employ Hybrid-ARQ (automatic repeat request) error control method in the receive path to improve the ability likelihood of the decoder to successfully decode in poor signal conditions. With HARQ, the wireless mobile device provides an acknowledgement (ACK) message if the received packet was successfully decoded or a negative-acknowledgement (NAK) if the message was not successfully decoded. The base station retransmits the packet if a NAK is received for a predetermined number of times before discarding the packet. Unless RF conditions improve from when a NAK was generated by the wireless mobile device and the next re-transmission, the likelihood of successfully decoding the retransmission is limited.

Similarly when performing a hand-off between base stations (or cells) the signal strength of adjacent cells can severely degrade link quality prior to handoff. In LTE the handoff between base stations is directed by the network resulting in potential periods where the signal strength of a serving base station degrades drastically as the signal strength of the adjacent base station increases prior to receiving a handoff message. Existing wireless mobile device designs rely on a single receiver design to address varying RF conditions and provide adequate power dissipation performance. The selection of a wireless mobile device receiver that fits the bulk of RF conditions limits the ability of the receiver to address sub-optimal RF conditions that occur frequently for short periods of time.

Therefore there is a need for improved state dependent advanced receiver processing in a receiver of wireless mobile devices.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
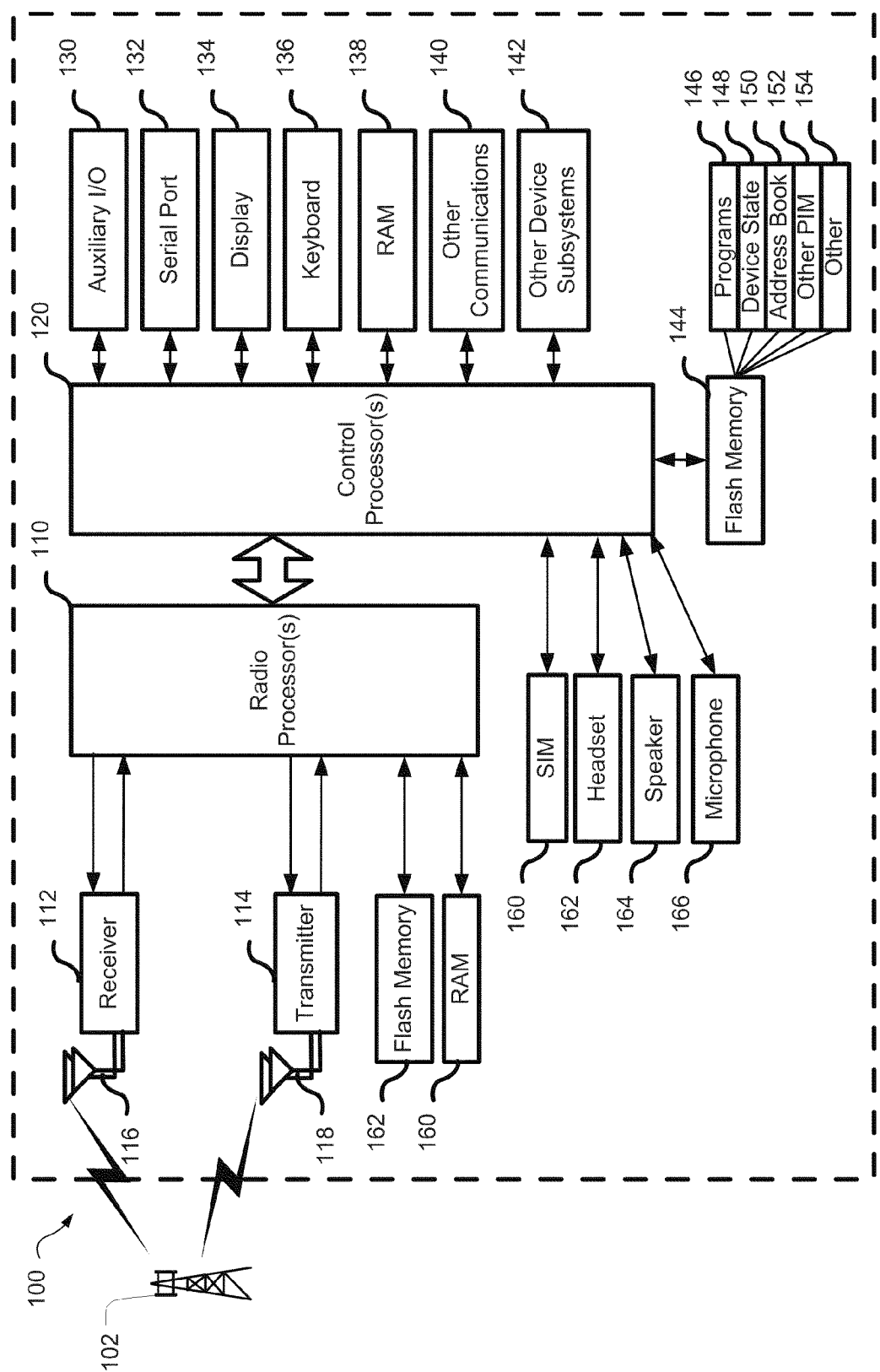
FIG. 1 is a block diagram of wireless mobile device.

In accordance with an aspect of the present disclosure there is provided a method for receiver processing in a 3GPP Long Term Evolution (LTE) wireless mobile device. The method comprising receiving a LTE initial sub-frame transmitted from a base station on a LTE signalling channel. The sub-frame received using a basic receiver in the wireless mobile device. An integrity check is performed on the initial sub-frame to determine if the sub-frame was demodulated and decoded correctly by the basic receiver. An advanced receiver is enabled providing advanced decoding algorithms compared to the basic receiver, the advanced receiver enabled prior to receiving an expected retransmission sub-frame based upon the integrity check failing and a hybrid-acknowledgement request (HARQ) negative acknowledgement (NAK) being sent to the base station by the wireless mobile device. The retransmission sub-frame transmitted from the base station is received using the advanced receiver. An integrity check is performed on the retransmission sub-frame to determine if the retransmission sub-frame was demodulated and decoded correctly by the advanced receiver. The basic receiver is enabled when the integrity check of the retransmission sub-frame passes and a HARQ acknowledgement (ACK) is sent to the base station by the wireless mobile device or a new data indicator (NDI) is set in a control channel indicating that the transmission is an initial transmission.

In accordance with another aspect there is provided a state dependent receiver processing chain for use in a wireless mobile device for GPP Long Term Evolution (LTE) communications. The receiver processing chain comprising a basic receiver for processing LTE initial sub-frames transmitted from a base station on a LTE signalling channel. The sub-frame is received using a basic receiver in the wireless mobile device. An advanced receiver provides advanced decoding algorithms compared to the basic receiver. The advanced receiver is enabled prior to receiving an expected retransmission sub-frame based upon the integrity check failing and a hybrid-acknowledgement request (HARQ) negative acknowledgement (NAK) being sent to the base station by the wireless mobile device. A decision unit enables the advanced receiver when a NAK is sent to the base station by the wireless mobile device and for enabling the basic receiver when the integrity check of the retransmission sub-frame passes and a HARQ acknowledgement (ACK) is sent to the base station by the wireless mobile device or a new data indicator (NDI) is set in the control channel indicating that the transmission is an initial transmission.

In selecting a receiver for a wireless mobile device there is always a tradeoff in the performance characteristics between link performance (being able to successfully decode the transmission from the base station) and power dissipation which directly corresponds to battery life. It is possible to choose very complex algorithms to process the signal that yield better link performance but this will also lead to higher power dissipation. The typical receiver, referred herein as the basic receiver, provides sufficient reception and decoding capabilities for the majority of operating environments. However, there are conditions where the basic receiver algorithms or configuration may not be sufficient to successfully decode incoming data increasing the chance of a dropped connection.

The disclosure provides a method and apparatus to provide a better tradeoff of good link performance and lower power dissipation in the context of the receiver state. By determining an operational state of a wireless mobile device, an advanced receiver can be selected to provide improved decoding characteristics to improve performance of the wireless mobile device. In an LTE receiver, operational states such as transmission index receiver processing, based upon HARQ (Hybrid Automatic Repeat reQuest), and measurement dependent receiver processing, based upon performance measurements to determine a channel metric that indicates the likelihood of a handover, can be utilized to determine conditions to switch from a basic receiver to an advanced receiver state to improve performance of the wireless mobile device.

By limiting the conditions in which an advanced receiver is utilized link quality can be improved and the impact on battery life can be minimized. The minimal battery life impact can far out-weigh the benefits of dropping calls less frequently. Conversely the use of an advanced receiver may also save some power because any time when a call is dropped the wireless mobile device moves to an 'idle' state and need to move back to a 'connected' state. This change of operational state requires signalling between the wireless mobile device and network and this signalling consumes power.

When using the HARQ process, when a transmission to a wireless mobile device fails, there will be a re-transmission to that wireless mobile device sometime shortly after that (more specifically, in the next few sub-frames after the NAK is transmitted to the base station). The wireless mobile device receiver disclosed exploits this fact by turning on, or enabling, a more powerful advanced receiver for only those few sub-frames after the NAK has been transmitted until the retransmission has been received. In addition the advanced receiver can be utilized when a handoff may fail due to decreased RF performance based upon a determined metric providing a characterization of the RF channel quality. By doing this the probability of successfully receiving the retransmission is increased leading to better link performance (higher throughput at a given distance from the base station, or better coverage (ability to operate further away from the base station)), lower latency, and fewer retransmissions thereby leading to lower power dissipation (longer battery life). As such the power cost of the more advanced algorithms is minimal and even this is mitigated by the fact that fewer retransmissions are required and the likelihood of drop calls are decreased.

Note that the disclosure is particularly relevant to those receiver algorithms that are running all the time when the wireless mobile device is in a connected state. These algorithms are the ones that need to be running to enable the detection of the control channel and also to detect any data transmissions on that initial transmission (in the same sub-frame). The main example is channel estimation but may also include frequency offset correction, timing synchronization, interference cancellation, and noise power estimation.

FIG. 1 is a block diagram of a wireless mobile device 100 incorporating a communication subsystem having both a receiver 112 and a transmitter 114 for performing modulation and demodulation, as well as associated components such as one or more embedded or internal antenna elements 116 and 118, and a radio processor(s) 110 which may include one or more digital signal processors or application specific integrated circuits for performing decoding and encoding functions. The particular design of the communication subsystem will be dependent upon the communication network in which the device is intended to operate such as 3GPP LTE or future 4G wireless networks.

The wireless mobile device 100 performs synchronization, registration or activation procedures by sending and receiving communication signals over an RF channel from a base station 102 as part of a wireless network. Downlink signals received by one or more antennas 116 through communication network 100 are input to receiver 112, which may perform such common receiver functions as signal amplification, frequency down conversion, filtering, channel selection and the like, and for example analog to digital (A/D) conversion. ND conversion of a received signal allows more complex communication functions such as demodulation, decoding and synchronization to be performed in a digital signal processor (DSP). Decoding may utilize any type of FEC decoder, such as for example but not limited to Turbo codes, low-density parity-check codes (LDPC), or convolutional codes may be used in the decoding process.

In a similar manner, signals to be transmitted are processed, including modulation and encoding for example, by a DSP and input to transmitter 114 for digital to analog conversion, frequency up conversion, filtering, amplification and transmission over the communication network via one or more antennas 118. The radio processor(s) 110 not only processes communication signals, but also provides for receiver and transmitter control. One or more DSPs are located on radio processor(s) 110 with network communication functions are performed through radio processor(s) 110. Radio processor(s) 110 interacts with receiver 112 and transmitter 114, and further with flash memory 122, random access memory (RAM) 124.

Control processor(s) 120 interacts with further device subsystems such as the display 124, flash memory 144, random access memory (RAM) 138, auxiliary input/output (I/O) subsystems 130, serial port 132, input device(s) 136, subscriber identity module 160, headset 162, speaker 164, microphone 166, other communications devices 140 and other device subsystems generally designated as 142. Data is provided to and received from radio processor(s) 110 to control processor (s) 120.

Some of the subsystems shown in FIG. 1 perform communication-related functions, whereas other subsystems may provide "resident" or on-device functions. Notably, some subsystems, such input devices 136 and display 122, for example, may be used for both communication-related functions, such as entering a text message for transmission over a communication network, and device-resident functions such as a calculator or task list. The input devices 136 may comprise but not be limited to keyboard, trackball, thumbwheel or touch screen.

Software used by radio processor(s) 110 and control processor(s) 120 is preferably stored in a persistent store such as flash memory 122 and 144, which may instead be a read-only memory (ROM) or similar storage element (not shown). It will be appreciated that the operating system, specific device applications, or parts thereof, may be temporarily loaded into a volatile memory such as RAM 124 and RAM 138. Received communication signals may also be stored in RAM 124.

As shown, flash memory 144 can be segregated into different areas for computer programs 146, device state 148, address book 150, other personal information management (PIM) 152 and other functionality generally designated as 154. These different storage types indicate that each program can allocate a portion of flash memory 144 for their own data storage requirements. Control processor(s) 120, in addition to its operating system functions, preferably enables execution of software applications on the mobile wireless device.

For voice communications, overall operation of wireless mobile device 100 is similar, except that received signals would preferably be output to the speaker 164 or headset 162 and signals for transmission would be generated by the microphone 166. Other device subsystems 140, such as a short-range communications subsystem, is a further optional component which may provide for communication between wireless mobile device 100 and different systems or devices, which need not necessarily be similar devices. For example, the subsystem 140 may include an infrared device and associated circuits and components or a Bluetooth™ communication module to provide for communication with similarly enabled systems and devices.

Figure 2:
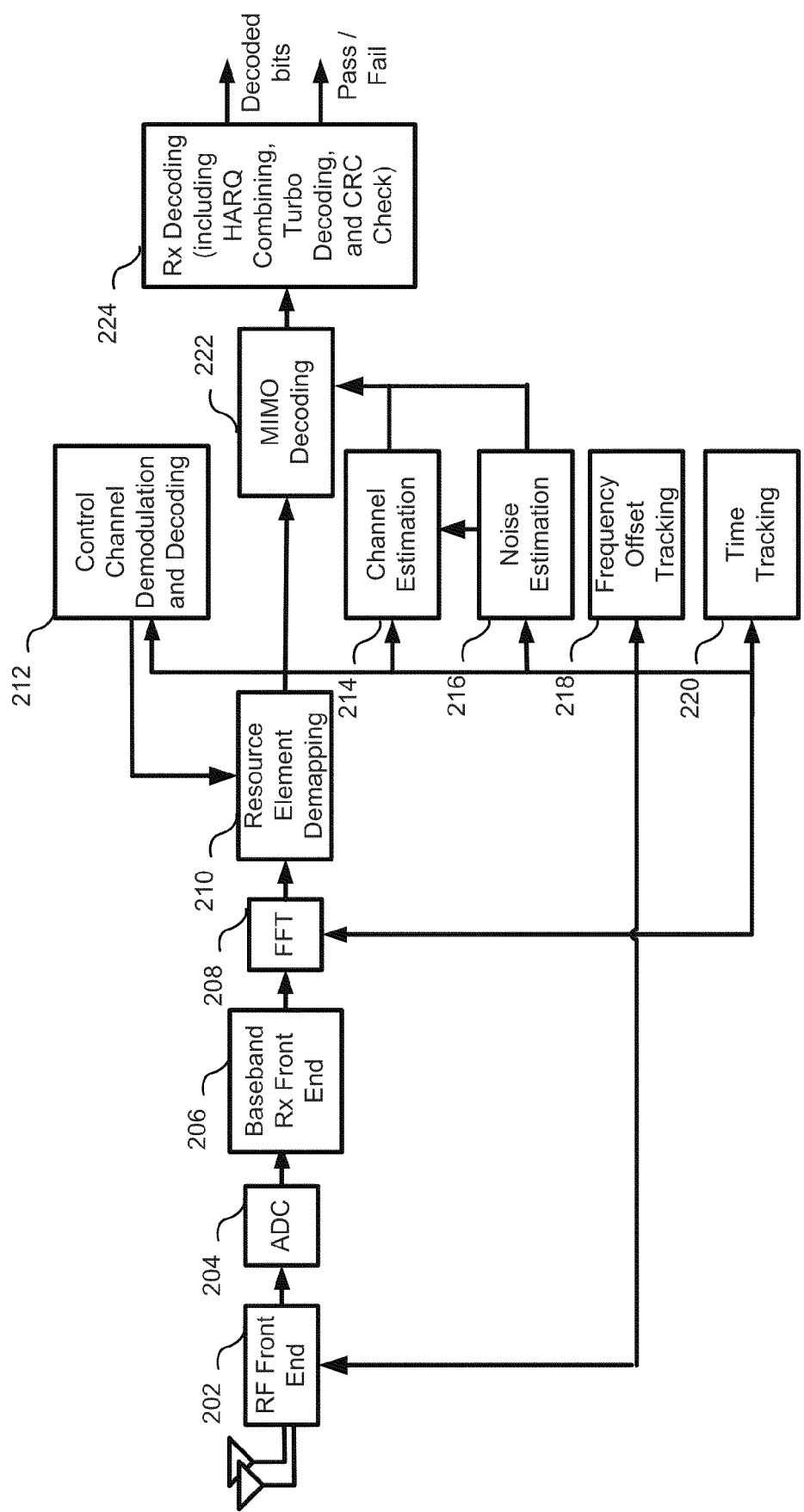
FIG. 2 is a schematic representation of a simplified block diagram of a receiver processing chain in the wireless mobile device.

FIG. 2 illustrates a simplified block diagram of a receiver processing chain provided by receiver 112 and radio processor 110 in the wireless mobile device. The RF front end 202 provides RF filtering and amplification of the signal. It also down-converts the RF signal to baseband. Note that there are typically more than one receiver antenna and the processing up to the multiple-input-multiple-output (MIMO) decoding occurs for the signal for both receiver antennas. The analog samples are put through an analog to digital convertor (ADC) 204. The output is a set of in-phase and quadrature (I/O) samples with a particular bit-width. The baseband has a front end portion 206 that provides filtering, gain control, and correction of the some of the RF imperfections (DC offset, I/Q imbalance). The time-domain samples are put through a Fast Fourier Transform (FFT) 208 which converts the samples to the frequency domain. The output of the FFT 208 are called resource elements (RE) in LTE.

The complete set of REs consists of many different signals. There are reference signals (RS) which are known to the wireless mobile device for channel estimation etc. There are four different types of control channel symbols, two different types of synchronization sequences for cell search and finally, there are the data REs. The data REs may be for one or more mobile wireless devices. The wireless mobile device has to read the control channel every sub-frame to determine if there is data for it in the current sub-frame. The control channel also gives any critical information for properly demodulating the signal. The resource element demapping 210 knows where all of these different REs are and distributes them to the correct module. Note that a buffer is provided as the control channel has to be read first to tell the resource element demapping 210 where the data REs are. This is performed by the control channel demodulation and decoding unit 212. Channel estimation 214 and noise estimation 216 are then performed on the reference symbols. The output of the channel and noise estimation is sent to a MIMO decoder 222 which attempts to equalize the channel and outputs soft bits. The soft bits are bit decisions with additional information to indicate the reliability of the bits. The soft bits are provided to receiver decoder 224 which is generalized as providing several different blocks: descrambling, code block segmentation, HARQ combining, code block de-interleaving, Turbo decoding, and a CRC check. The output of the decoder is a pass/fail and if it passed, the decoded bits.

Also shown on the FIG. 2, tracking loops are also utilized in the receiver. A frequency offset must be tracked. This block is sometimes called the automatic frequency control 218 (AFC). The AFC 218 determines the frequency offset and instructs the RF front end to compensate. The time tracking 220 determines the timing of the received signal and to track that timing as it changes. The time tracking estimate is fed to the FFT 208 which uses that information to determine over which set of received samples to perform the FFT 208.

The receiver processing chain is typically implemented with what would be deemed a basic receiver which provides capabilities that address decoding and power requirements for the majority of operational situations. The use of a more advanced receiver providing advanced algorithms, in place of a basic receiver, for regular operation is not preferred due to the additional power requirements during operation. However, the selective use of the advanced receiver at predefined operational states can provide considerable performance advantage in terms of the quality of the link between the wireless mobile device and the base station and battery performance.

There are multiple opportunities in the receiver chain to distinguish between basic and advanced receiver performance. The number of bits used by the ADC can be adjusted to provide greater resolution. The number of bits can be increased throughout the receiver chain as well to represent the signal being processed. The fewer bits utilized results in more degradation due to quantization. But, the fewer the bits the less the complexity of the receiver, and lower power consumption. If the number of bits can be adjusted then the performance of the receiver can be adjusted.

In addition, the baseband receiver front end 206 can provide filters based upon the basic or advanced receiver configuration where the basic receiver utilizes a short filter with acceptable performance and the advanced receiver uses a long filter with superior performance (better isolation of the desired frequency band, lower in-band ripple, etc.).

Control channel decoding is itself a receiver chain much like that for the data with its own channel estimation, multiple-input-multiple-output (MIMO) decoding, and decoding—which in this case is a tail-biting convolutional code. One example of adjusting the performance is the number of iterations used by the convolutional decoder. The more iterations the better the performance but the higher the power. There are many different types of MIMO decoders. A maximum likelihood decoder is considered the best from a performance point of view but is very complex. A minimum-mean-square-error-based (MMSE) decoder is simpler with a corresponding degradation in performance. The configuration of one or more MIMO decoders can be tailored to improve performance.

There are many different types of channel estimation algorithms with varying performance/complexity tradeoffs. A simple linear interpolation is simple but doesn't perform very well. A MMSE decoder is much more complex but yields much better performance. Again, within each of these there are design choices which will dictate that performance/complexity tradeoff.

The channel estimation algorithm uses a number of reference signals to determine the channel. The more reference signals used the better the estimate (particularly at low speeds and in channels with a high coherence bandwidth) but the higher the complexity. Therefore a more advanced receiver can utilize an increased number of RS to provide a better estimate. The same applies to noise estimation. Channel estimation in a basic receiver algorithm may choose not to interpolate the channel estimates across the sub-frame boundaries whereas an advanced algorithm may choose to do so, yielding a performance benefit.

A basic receiver may choose to implement a simple linear interpolation between the channel estimates made at the pilot locations in frequency whereas an advanced algorithm may implement a more advanced filter better smoothing the samples across the frequency band. For demodulation/equalization an advanced algorithm might be a maximum likelihood detector whereas a more basic algorithm may employ zero forcing or minimum mean squared error detection. An advanced algorithm would implement some form of interference cancellation to remove unwanted inter-cell interference. The more basic approach would be to not cancel interference at all.

The tracking loops (AFC and time tracking) both use the reference signals to make estimates. The more RS they use the better they are able to track changes in frequency offset and timing. In the receiver decoder the HARQ and Turbo decoding are two places where performance can be adjusted. With the Turbo decoding, for instance, the number of iterations can be adjusted.

An advanced receiver can be a receiver optimized for low signal-to-noise-ratio (SNR) reception. This is particularly the case for the measurement dependent receiver. Note that these are not exactly the same thing. When a receiver is designed trade-offs are made to try and design something that works well across the whole range of SNRs at which the receiver may work. If it is known that the SNR was very low specific optimizations can be made so that the receiver will work well only at that low SNR range perhaps degrading the performance at the higher SNRs.

Figure 3:
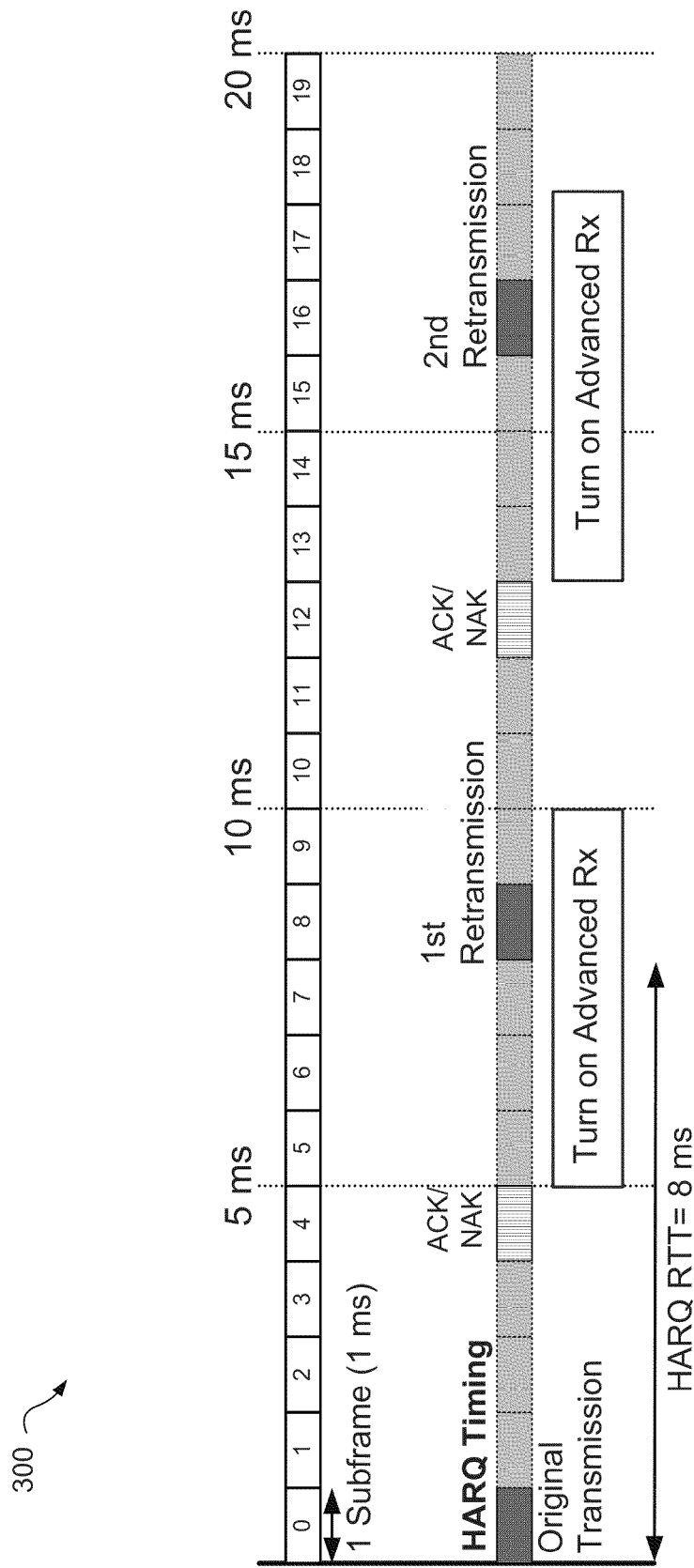
FIG. 3 illustrates the transmission timing in an LTE system.

FIG. 3 shows the timing 300 of the original transmission, the ACK/NAK transmission, and the retransmissions for an LTE system. All modern communications systems employ similar mechanisms to realize efficient and reliable communication. Hybrid-ARQ (automatic repeat request) error control method in the receive path to improve the ability of the decoder to successfully decode in poor signal conditions. The base station encodes the information bits, modulates them and transmits (all or a portion of) them over the air to the mobile wireless device. Additional bits are appended to the signal as a means of performing an integrity check (such as a CRC—cyclic redundancy check). The base station keeps a copy of the transmitted signal in memory. The wireless mobile device attempts to demodulate and decode the signal. It checks the integrity check bits to determine if the reception is successful. If the reception is successful the bits are passed up to the higher layer processing and a positive acknowledgement (referred to as an ACK) signal is transmitted from the wireless mobile device to the base station. Upon reception of the ACK the base station considers the transmission successful and discards its copy of the transmitted signal. If the reception fails, the receiver state (more specifically the log-likelihood ratios, or LLRs) is maintained in memory at the wireless mobile device and a negative acknowledgement (NAK) signal is transmitted from the wireless mobile device to the base station. Upon reception of the NAK the base station retransmits the original transmitted signal (or a portion of it).

The process at the wireless mobile device is repeated until the reception is successful or some maximum number of transmissions has been attempted. With each retransmission the receiver combines the maintained receiver state information from the previous transmissions with the signal from the current transmission to better detect the signal. The HARQ process provides a very tight feedback loop with retransmissions occurring very shortly after the previous transmission in order to keep the overall latency low. For the operation of transmission index dependent processing, when the receiver issued a NAK message, for example at the $4^{th}$ sub-frame, the advanced receiver can be enabled to process the re-transmission. If the decoding of the transmission is unsuccessful and an additional NAK is sent at the $12^{th}$ sub-frame, the advanced receiver is again enabled for the $2^{nd}$ retransmission at the $16^{th}$ sub-frame. If an ACK is transmitted at the $12^{th}$ sub-frame the basic receiver can be re-enabled for the next initial transmission. In this manner when a NAK is issued the advanced receiver can be enabled to increase the likelihood of successful decoding. In LTE there is an indicator in the control channel transmission from the base station that indicates whether the data transmission in the current sub-frame is a new data transmission (i.e. an initial transmission) or a retransmission. This indicator is referred to as the new data indicator (NDI). If the NDI is set then the mobile device will go back to using the basic receiver to receive the next sub-frame as an initial or original transmission from the base station.

Figure 4:
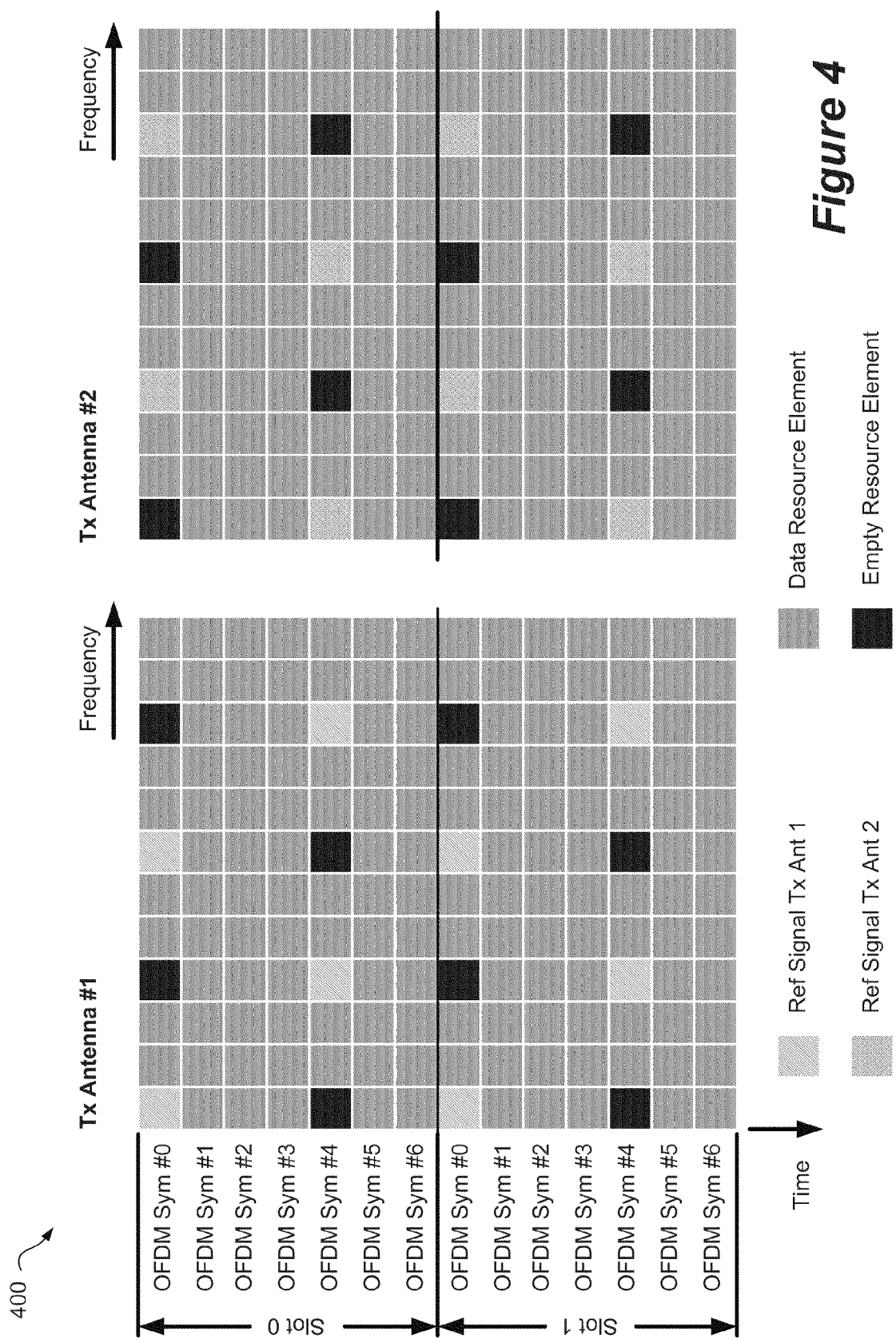
FIG. 4 illustrates the reference signal structure for LTE systems.

FIG. 4 illustrates the reference signal structure 400 for LTE. This regular structure is repeated sub-frame after sub-frame to enable the interpolation across sub-frames. The control channel is in the first 1-4 OFDM symbols in the sub-frame. A basic channel estimation algorithm would not perform interpolation of channel estimates using the reference signals in the previous sub-frames. This is a particularly relevant point when considering the fact that for the majority of sub-frames there is no data for a particular user. Given that there are reference signals in the first OFDM symbol interpolation with the reference symbols in the previous (or next) sub-frame may not be necessary for the control channel detection. If there is a scheduled transmission to this mobile wireless device, however, that interpolation could be quite useful to better receive the signal successfully.

After the original transmission in sub-frame 0 the ACK or NAK is transmitted back to the base station in sub-frame 4. The $1^{st}$ retransmission occurs in sub-frame 8. This figure implies that the HARQ is synchronous meaning that the timing is fixed—with the retransmissions occurring every 8 ms after the previous transmission. Asynchronous HARQ is also possible (and is the case in LTE). With asynchronous HARQ the retransmission can be anytime after the corresponding ACK/NAK is received and the base station must signal to the wireless mobile device if the retransmission is present via signaling on a control channel or if the transmission represents an initial transmission (i.e. new data) via the NDI.

Most modern cellular communications systems (HSPA, WiMAX, LTE, . . . ) are packet based systems with transmissions to a given wireless mobile device dynamically scheduled. In LTE the wireless mobile device must decode a control channel every sub-frame (1 ms) to see if there is data for it in that sub-frame. If there is, the wireless mobile device demodulates and decodes the rest of the sub-frame. If there isn't the wireless mobile device can turn itself off for the remainder of the sub-frame. In these systems the wireless mobile device can not predict when data will be sent to it. The overall transmission resource is being shared by many (maybe 100's) of users. A scheduler in the base station makes the decision of when to send data to each user. LTE is a dynamically scheduled packet based system in that for each sub-frame the wireless mobile device needs to decode a control channel to see if there is data for receiver (i.e. the handoff message, retransmission or determining if an NDI is present). Knowing that a control message targeted to the wireless mobile is very likely to be impending, the control channel receiver can be optimized (in addition to having an optimal data channel receiver) by using the advanced receiver to increase the likelihood of decoding.

Figure 5:
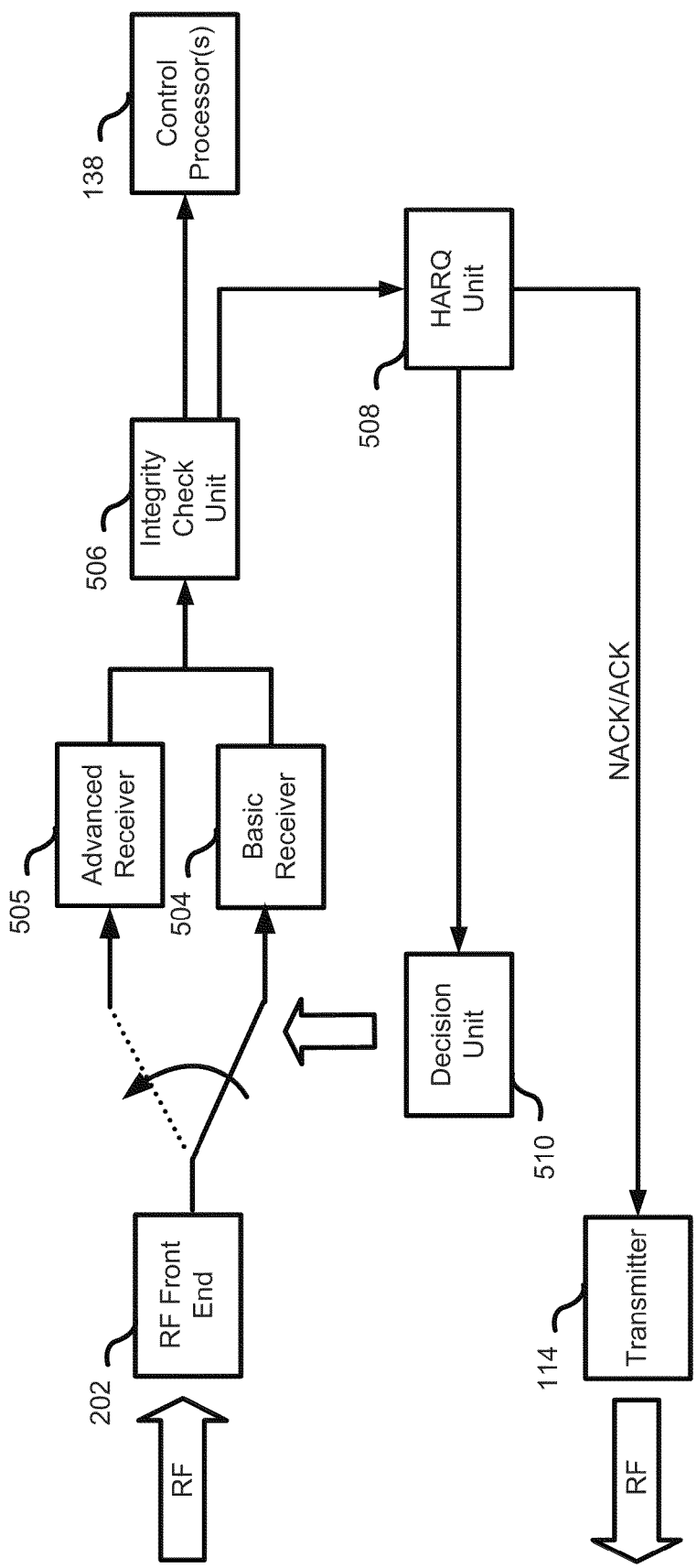
FIG. 5 is a schematic representation of a receiver providing transmission index dependent receiver processing.

FIG. 5 is a schematic representation of a transmission index dependent receiver. The device may be integrated as a dedicated integrated circuit or as multiple components as required. In addition, some of the logic function may be implemented as part of the radio processor(s) 110 or control processor(s) 120 depending on the design considerations. The receiver comprises a decision unit 510 for determining whether a basic receiver 504 or advanced receiver 505 should be utilized in the receiver processing chain. RF signals are received by the RF front end 202 processing and filtering the RF signal down to baseband. The decision unit 510 enables the selection of the basic receiver 504 or advanced receiver 505 based upon the HARQ state. The selection may occur by enabling or disabling the appropriate receiver or routing of the signal to the receiver. The decision unit 510 may activate a switch that feeds the received signal to the advanced receiver. These units may be discrete components (or units), an integrated unit or incorporated in other components of the wireless mobile device.

When the basic receiver 504 is not successful at decoding an incoming data packet, determined by an integrity check unit 506 by a failed cyclic redundancy code (CRC) check, a NAK is sent to the base station to request a retransmission. The HARQ process of the receiver generates the NAK message to the transmitter 114, by the appropriate encoding through the radio processor(s) 110 (not shown). The base station will then generate a re-transmission of the packet. The decision unit 510 receives the NAK request and enables the advanced receiver 505 to improve the chances of successfully decoding the packet. The decision unit 510 selects the basic receiver whenever an initial transmission is indicated via the NDI on the control channel. The HARQ unit can then provide a NAK or ACK to the transmitter 114, by the appropriate encoding through the radio processor(s) 110 (not shown).

A simple model can be considered to demonstrate the benefits providing the ability to select between a basic receiver and an advanced receiver in a transmission index dependent operating state.

Case 1—Basic Receiver Algorithms
Assumptions:
   30% error rate for each transmission (leading to 9% error rate after the $2^{nd}$ transmission, 2.7% after the $3^{rd}$, and 0.81% error rate after the 4th transmission)
   Power cost of 1 (normalized units) for each reception and 0.3 for the transmission of the ACK/NAK
   Initial transmission latency of 4 ms
   Retransmission latency of 8 ms
   Max 4 transmissions In this case, the total average power cost is 1.84, the average latency is 7.34 ms, and the residual error rate after the 4th transmission is 0.81%.

Case 2—Basic Receiver Algorithms on 1st Transmission, Advanced Algorithms on Rest
Assumptions:
   30% error rate with basic algorithms (1st transmission)
   5% error rate with advanced algorithms (2nd-4th transmission)
   Result: 1st transmission error rate 30%, 1.5% after the 2nd, 0.075% after the 3rd, 0.00375% after the 4th
   Power cost of 1 (normalized units) for reception with basic algorithms, 1.4 for reception with advanced algorithms, and 0.3 for the transmission of the ACK/NAK
   Initial transmission latency of 4 ms
   Retransmission latency of 8 ms
   Max 4 transmissions In this case, total average power cost is also 1.84, the average latency is 6.53 ms, and the residual error rate after the 4th transmission is 0.00375%.

With the presence of HARQ the system can be very aggressive in the choice of modulation and code rate for the transmission. Typically a target block error rate for the initial transmission is in the range of 10-30%. In other words, 10-30% of the time at least one retransmission will be required. A second retransmission would be required roughly 1-3% of the time.

This simple model demonstrates the ability to have no increase in the average power cost but achieving a latency that is almost 1 ms lower and a significantly lower residual error rate which corresponds to a higher throughput and better coverage (ability to work successfully further away from the base station). One alternative way to view the benefit of implementing this method is that for a given level of link performance it allows for less complex algorithms to be employed for the first transmission.

It should be noted that the basic receiver must be utilized during the initial transmission from the base station to the mobile as the wireless mobile device must report its channel quality to the base station in LTE. The channel quality corresponds to achieving a set block error rate, which is 10% in the case of LTE, for that mobile wireless device's receiver. The standards bodies issue conformance tests that the wireless mobile device must satisfy to verify that the wireless mobile device is indeed achieving a 10% BLER on that initial transmission. In other words, if receiver utilizes an advanced receiver algorithm the channel quality must still be reported that will result in 10% BLER. The error rate on the initial transmission will not be any different because the network will be more aggressive in its choice of modulation and code rate. The net result is higher throughput for the wireless mobile device and better coverage but the power dissipation is correspondingly higher. For the transmission index dependent receiver processing the receiver may be operating at any SNR (including a relatively high SNR). Here the base station was too aggressive in its choice of modulation and coding. In this case the advanced receiver must work well across the full range of SNRs.

Figure 6:
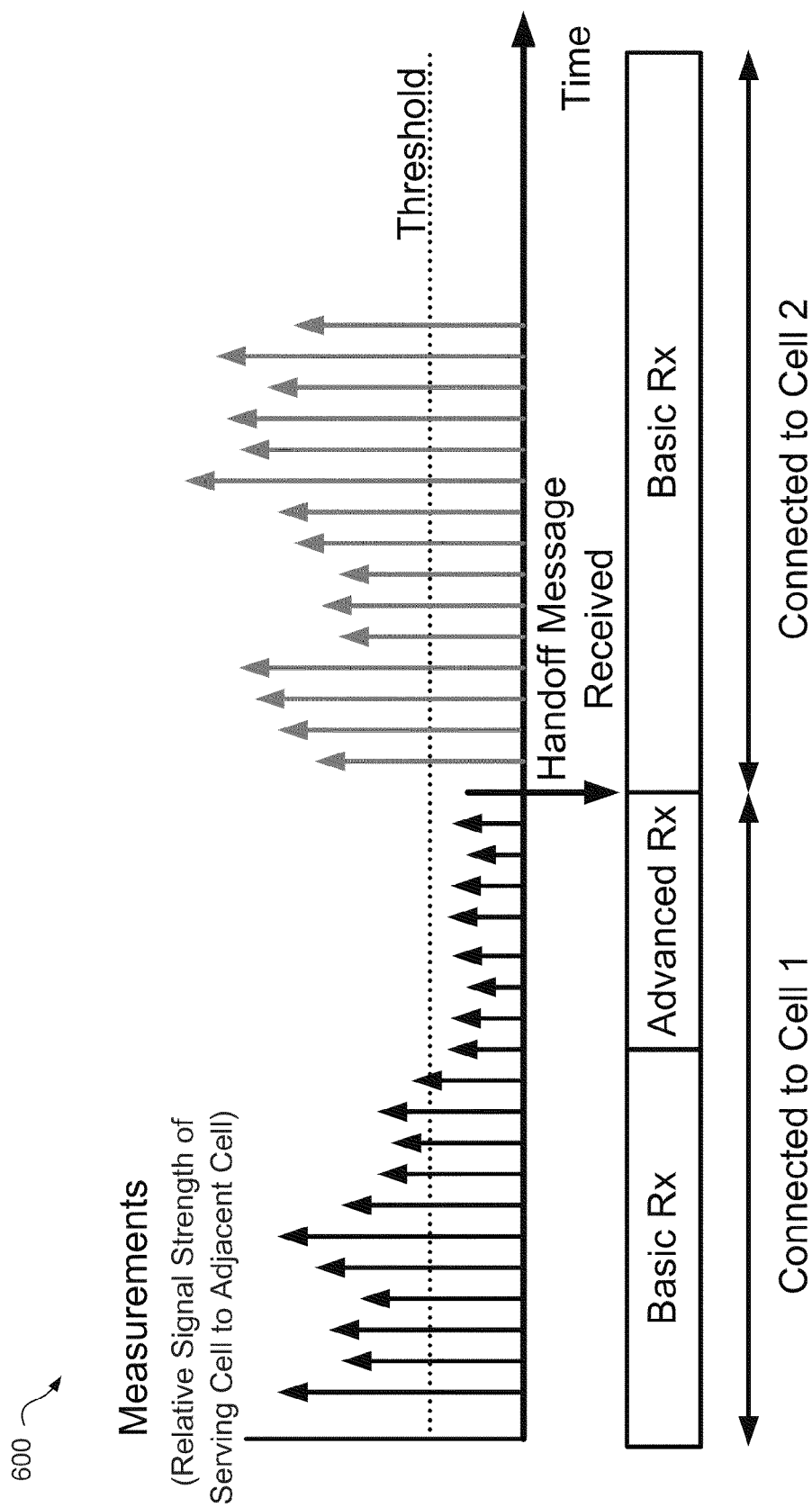
FIG. 6 is representation of turning on an advanced receiver after a measurement has dropped below a threshold.

FIG. 6 is a representation 600 of turning on an advanced receiver after a measurement has dropped below a threshold in the measurement dependent receiver processing operating state. Because the wireless mobile device is making the measurements of the adjacent cells, it can anticipate that a handover message from the network is imminent. To maximize the chances that the handover message will be received, the receiver chain turns on, or enables the more powerful (advanced) receiver algorithm. The advanced receiver is enabled until the handover message is correctly received, or until the measurements indicate that a handover is no longer likely to be imminent. By doing this the wireless mobile device is better able to receive the handover message and thereby have fewer dropped calls. The advanced receiver is only turned on for a short time and therefore doesn't have a significant impact on the overall battery life.

In LTE systems, when the wireless mobile device is in the connected mode, handoff decisions are made by the network. The wireless mobile device is constantly performing measurements of the strength of the signal from the serving and adjacent cells and reporting these measurements back to its serving cell. The network uses these measurements to decide whether to make a hand-off of the wireless mobile device to an adjacent cell. At this point a problem can occur. If the propagation conditions have deteriorated too quickly, the wireless mobile device may not receive the message from the network to make the handover. The result can be a dropped call.

Figure 7:
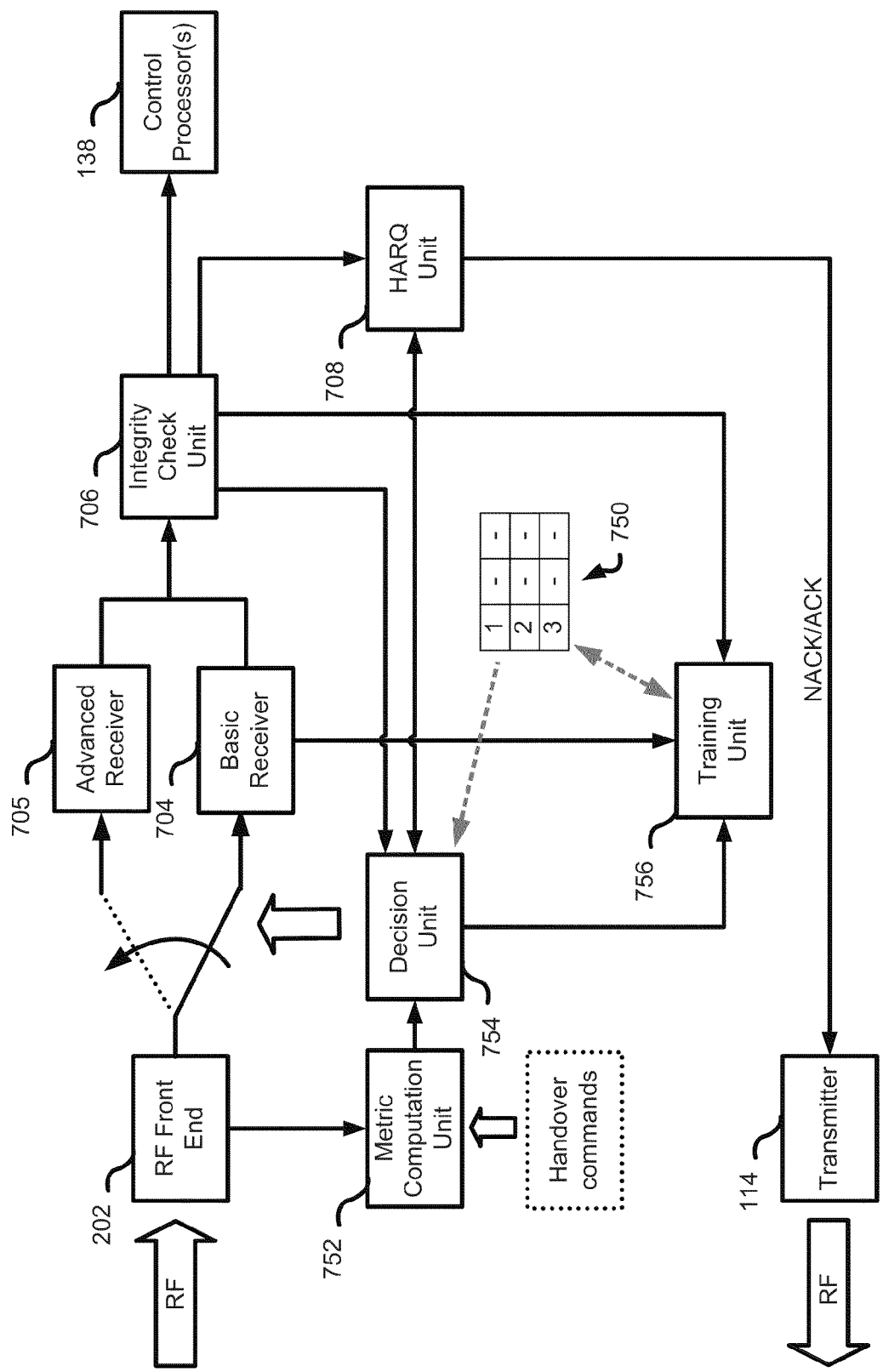
FIG. 7 is a schematic representation of a receiver providing state dependent advanced receiver processing.

FIG. 7 is a schematic representation of a receiver providing state dependent advanced receiver processing incorporating both transmission index dependent receiver processing and measurement dependent receiver processing. The device may be integrated as a decided integrated circuit or as multiple components as required. In addition, some of the logic function may be implemented as part of the radio processor(s) 110 or control processor(s) 120 depending on the design considerations.

As with FIG. 5, the decision unit 754 determines when to switch between the basic receiver 704 and the advanced receiver 705. However in this configuration additional inputs are provided to the decision unit 754. A metric computation unit 752, or a measurement unit, reports its measurements to the decision unit 754. The decision unit receives metric measurements from the RF front end 202 or from the receiver units themselves. The decision unit performs some computations on the measurements to compute a metric that indicates the likelihood of a handoff based upon the current RF conditions. This state may be the ratio of the serving cell signal strength to that of the strongest adjacent cell. The decision unit compares this metric to a threshold. If the metric falls below the threshold (possibly for some required length of time) the advanced receiver is enabled. The advanced receiver stays enabled until the handover message is correctly received or until the metric rises above the threshold for some required amount of time.

In the threshold dependent processing state the decision unit 754 utilizes the retrieved threshold to compare to the metric from the metric computation unit to select the basic receiver 704 or advanced receiver 705. Threshold values may be preloaded in memory during an initial software load or programming of the wireless mobile device. The threshold is determined through empirical evaluation with the particular decoder being employed or during a training process performed during normal operation of the receiver using a training unit 756. The threshold should be set in such a way that the advanced receiver is activated before the basic receiver becomes unable to reliably detect the handover message from the base station. The decision unit 754 also receives handover commands processed by the control processor(s) 110 or an indication that a handover has occurred. The commands are utilized to determine when to switch back from the advanced receiver 705 to the basic receiver 704 as described in connection with FIG. 9.

The metric may be determined based upon measurements that are delivered to the network to determine whether or not to perform a handoff—the RSRP (reference signal received power), and the RSRQ (reference signal received quality). These are formally defined in 3GPP spec 36.214. The RSRP is a measure of the signal power and the RSRQ is a measure of the SNR. The distinction between the RSSI and RSRP is that the RSSI is a pure power measure without any knowledge of what the signal is while the RSRP uses the known pilot signals to be able to distinguish the desired/undesired portions of the signal. One thing to note is that it's really the ratio of the RSRP (or RSRQ) of the serving cell to the RSRP (or RSRQ) of a neighbor cell that indicates the likelihood that the wireless mobile device will be handed off to that neighboring cell (i.e. a neighbor cell has to be a better alternative than your serving cell). This ratio is what can be compared to the defined threshold rather than just the absolute value of the RSRP or RSRQ itself in defining the metric.

Reference signal received power (RSRP), is defined as the linear average over the power contributions of the resource elements that carry cell-specific reference signals within the considered measurement frequency bandwidth. If receiver diversity is in use by the mobile wireless device, the reported value shall not be lower than the corresponding RSRP of any of the individual diversity branches. The number of resource elements within the considered measurement frequency bandwidth and within the measurement period that are used by the wireless mobile device to determine RSRP is left up to the wireless mobile device implementation with the limitation that corresponding measurement accuracy requirements have to be fulfilled. The power per resource element is determined from the energy received during the useful part of the symbol, excluding the cyclic prefix (CP).

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power observed only in OFDM symbols containing reference symbols for antenna port 0, in the measurement bandwidth, over N number of resource blocks by the wireless mobile device from all sources, including co-channel serving and non-serving cells, adjacent channel interference, thermal noise etc.

The threshold may also be defined based upon hysteresis threshold providing a pair of thresholds so that the receiver does not flip back and forth, between the basic and advanced receivers. Alternatively, a timer may be provided that starts when the advanced receiver is initiated. If the timer expires (after some set amount of time) you switch back to the basic receiver.

A training unit 756 may be provided for determining threshold values to be used in comparison to the determined metric, as described in connection with FIG. 10. The receiver may go into a training mode where it computes the metric but completes the decoding to determine which threshold to be utilized based upon a failed decode by the basic receiver. The training unit 756 can also track the success of the decoder against the metric values and over time adjusts the threshold value to yield accurate estimation of basic receiver success to improve decode efficiency. The training unit 756 modifies or populates threshold values in table 750 during the training process. The table can be stored in memory such as 160 or 162 or in dedicated memory associated with the decision unit 754 and may be adapted in real-time at the receiver. The training unit 756 may not be required if the threshold values are pre-defined and loaded into the wireless mobile device at manufacture or via a software update.

In the receive path, an integrity check unit 706 performs a CRC or similar check on the received data blocks decoding has been performed. The integrity determines if the received code block is intact and therefore contains valid data. Data that passes the CRC check is passed to the control processor (s) 120. The integrity check unit 706 notifies a HARQ mechanism, represented by unit 708, whether the CRC check passed or failed. The decision unit 754 determines which operating state the receiver is operating in, such as transmission index or measurement dependent processing and make a decision on which receiver should be utilized accordingly. In transmission index processing the issuance of a NACK message will trigger the switch from the basic to advanced receivers and receipt of an initial transmission will trigger the switch back.

A table 750, stored in memory, may be provided that contains one or more reliability threshold values. The threshold values may be associated with particular channel parameters so that different threshold values may be utilized for different channel configurations. The threshold may be based on the transmission mode (single antenna, transmit diversity, closed-loop MIMO, open-loop MIMO, closed-loop rank 1 beamforming, etc.), the system bandwidth, the speed of the mobile, or the means by which the basic or advanced receiver are implemented.

Figure 8:
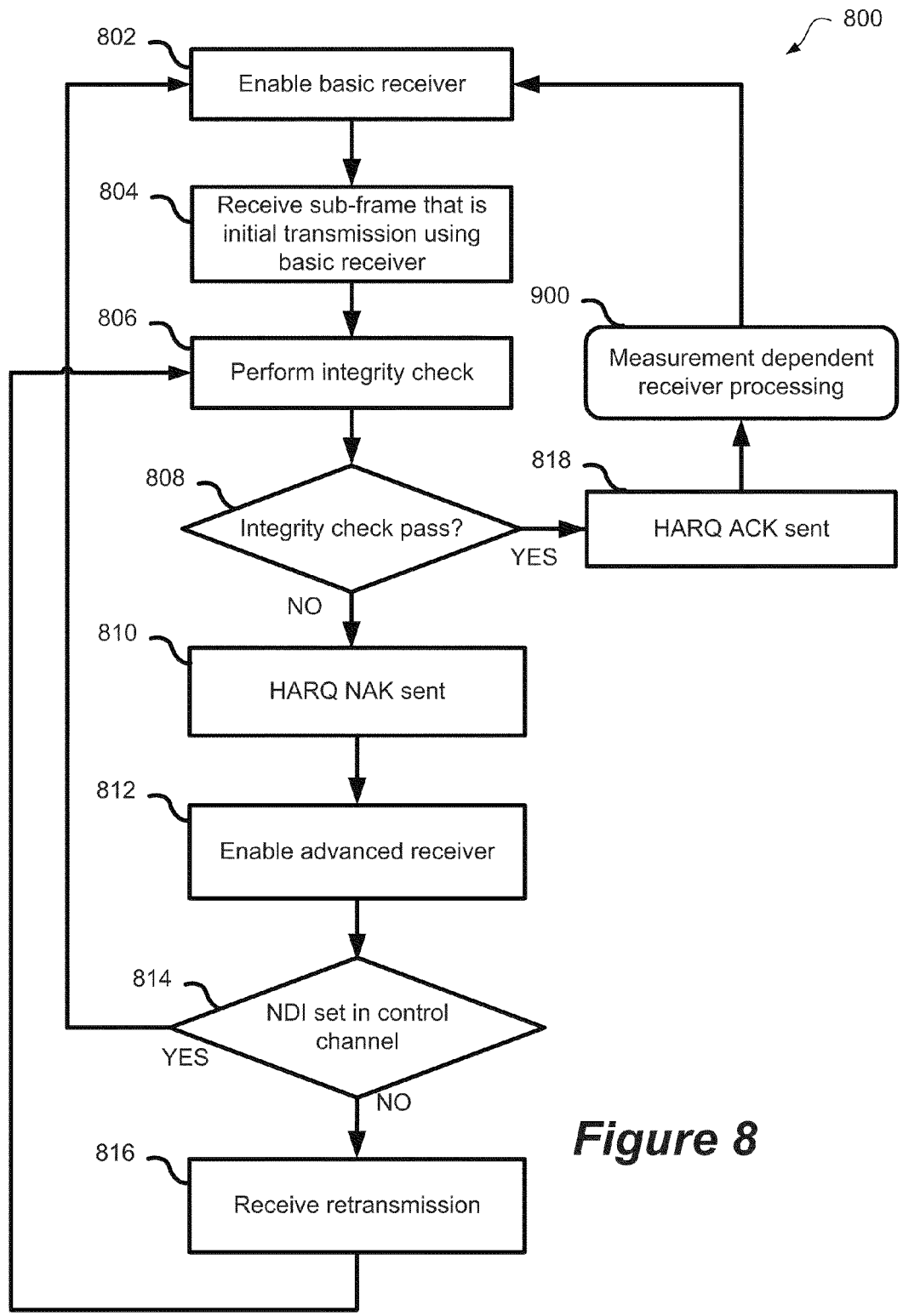
FIG. 8 is a method of transmission index dependent receiver processing.
Figure 9:
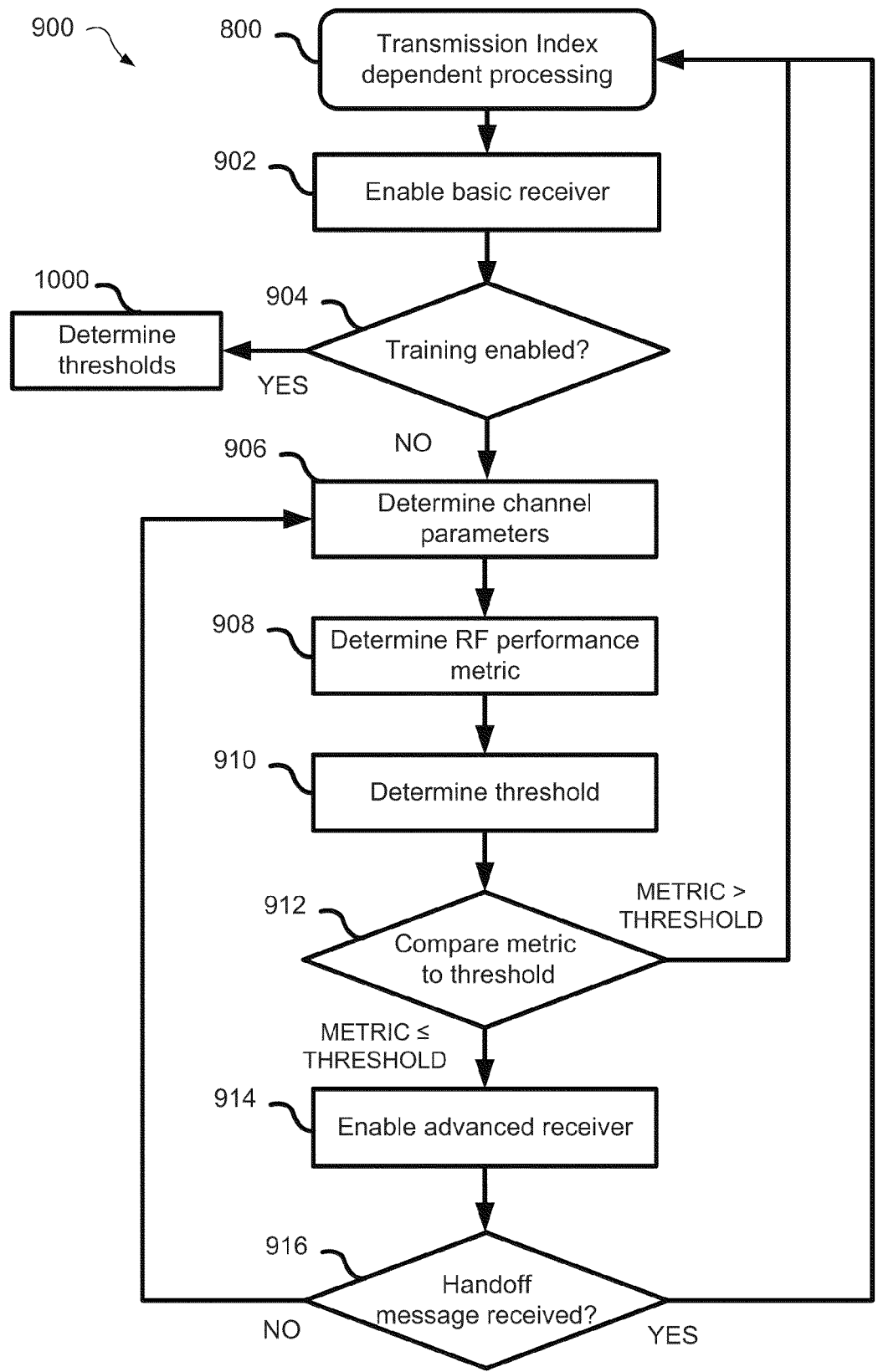
FIG. 9 is a method of measurement dependent receiver processing.

FIG. 8 is a method 800 of transmission dependent receiver processing. The receiver is assumed to be operating in basic receiver mode at 802. A sub-frame is then received at 804 and is the initial transmission from the base station. The received sub-frame can then be processed and an integrity check performed at 806. If the integrity check passes, YES at 808, a HARQ ACK is sent at 818 to the base station. The receiver can then change to measurement dependent receiver processing mode 900, and as shown in FIG. 9. If the integrity check fails, NO at 808, a HARQ NAK is sent to the base station at 810. When a NAK is sent back to the base station the base station will resend the transmission sub-frame unless the number of retransmissions has already been exceeded. The base station determines autonomously whether the maximum number of retransmissions has been achieved and makes a decision whether to retransmit the data or move on to the initial transmission of the next packet. This decision is indicated to the mobile station via the new data indicator (NDI) in the control channel. Prior to checking the control channel the advanced receiver can be enabled at 812. If the mobile device receives the NDI in the control channel, YES at 814, the basic receiver will receive the next initial sub-frame at 802. If the next transmission is going to be a retransmission as indicated by the control channel, NO at 814, the retransmission is received at 816 using the advanced receiver at the time slot indicated by the control channel and the integrity check is then performed at 806.

In an alternative method flow, when the integrity check fails, NO at 808, the HARQ NAK is sent to the base station at 810, the method can continue by using the basic receiver, or enabling the basic receiver if the advanced receiver is enabled to check the control channel for the NDI indicator. If the NDI is set in the control channel using the basic receiver, the method continues at 804. If the NDI is not set in the control channel, the advanced receiver is then enabled prior to receiving the retransmission at 816. Depending on the configuration of the method either the advanced receiver or basic receiver can be utilized for receiving control channel data.

FIG. 9 is a method 900 of threshold dependent receiver processing providing the ability to improve handling of potential call drop situations in the context of a packet based system with dynamic scheduling such as LTE where the handover is controlled by the network. When the transmission index dependent processing is successful and an ACK is received by method 800, the basic receiver is enabled at 902 (or presumed to be already enabled). If training mode is enabled, YES at 904, or required, such as during initial configuration or start-up where the threshold table is not populated for activating the advanced receiver, the thresholds are determined by method 1000 according to FIG. 10. If training is not enabled, NO at 904, the channel parameters are determined at 906 for the received down-converted signal. Channels parameters may not be determined if only one threshold is defined for all channel configurations. The channel parameters may be based upon transmission mode, system bandwidth, mobile speed, or receiver implementation. A metric value is then determined 908 for the channel based upon the ratio of the quality of the servicing cell signal to that of the strongest neighbour (typically based on the RSRP and/or RSRQ). A threshold is then determined at 910. The threshold value may be a single threshold or may be based upon the channel parameters which would require a lookup in a table to be performed to determine an associated threshold value for enabling the advanced receiver. The metric value is then compared to the threshold value 912. If the metric is less than or equal to or below the threshold the advanced receiver is enabled at 914. If a handoff message is received from the base station, YES at 916, transmission index dependent processing 800 is performed. If a handoff message is not received, NO at 916, the process is repeated until at 906 until the metric exceeds the threshold or a handoff message is received via the control channel.

Figure 10:
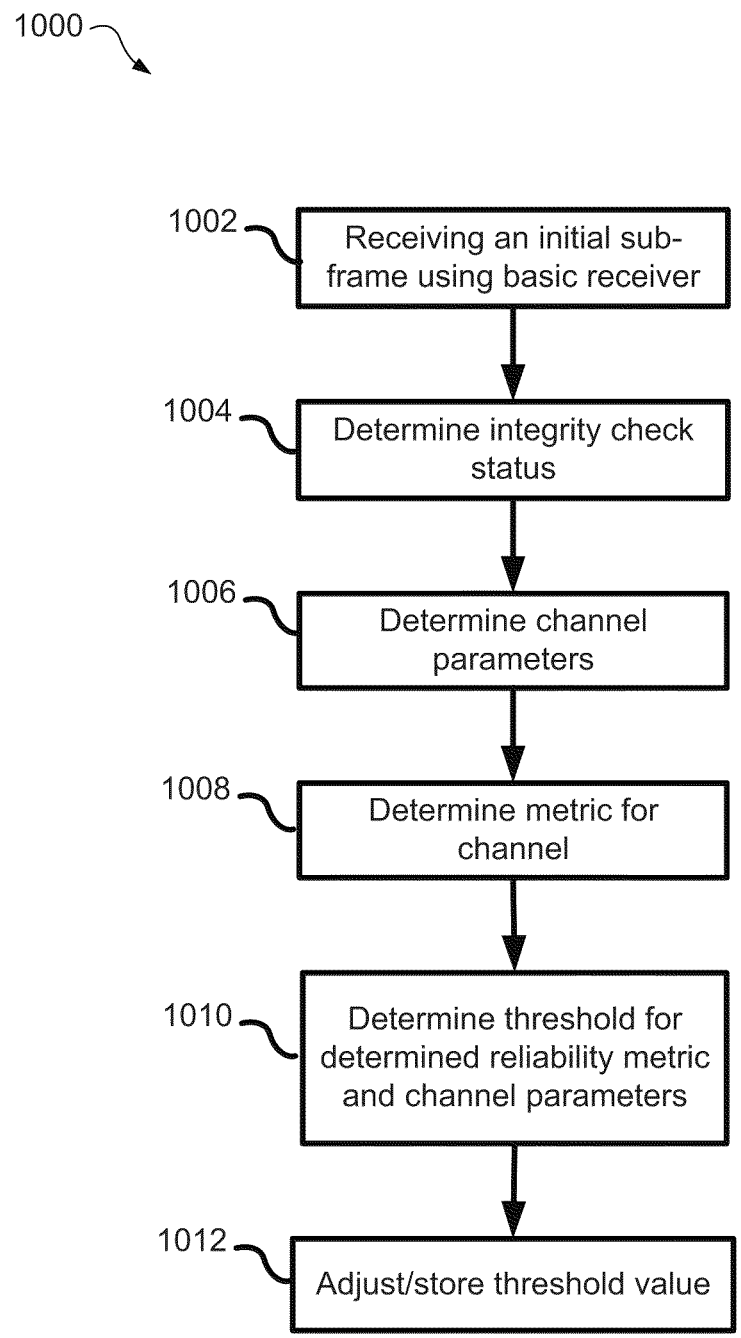
FIG. 10 is a method of training a receiver to determine threshold for measurement dependent receiver processing.

FIG. 10 shows a method 1000 for training the device for providing a threshold for the measurement dependent receiver processing state as performed by training unit 756. When training is selected the basic receiver is enabled at 1002 for receiving sub-frames from the base station. Training may be performed for the measurement dependent receiver processing state while still performing the transmission index dependent operation. When data is received and processed by the receiver chain an integrity check is performed at 1004 to determine an integrity check result. The integrity check result provides a passing result generating an ACK, or failing result generating an NAK. The channel parameters are determined at 1006 and associated with the determined integrity check result if more than one threshold is to be determined. The metric for the channel can then be determined at 1008. The threshold for the determined metric and channel parameters (if more than one threshold is determined) can then be determined at 1010 based upon the determined integrity check result. The threshold can then be adjusted accordingly at 1012 as described below.

The threshold may be adjusted in a number of ways based upon the determination of the integrity check, the channel parameters and the metric. The threshold can be set to be just a bit below that value of the metric where the basic receiver starts to fail, NAK result. Note that the performance degradation is not a sudden drop off—it's a gradual degradation so there is a judgment necessary to determine what failure rate is acceptable. The role of the training is to determine this relationship between the basic receiver performance (i.e. the detection failure rate for an initial transmission) and the value of the metric. A statistical relationship can be determined between the basic receiver performance and the metric. For the basic receiver performance to determine the failure rate observations can be collected over a long enough time period. The metric computation will also have some variance due to noise, etc.

The adjustment of the threshold can be done in a number of ways such as collecting observations of both the number of failed initial transmission detections for the basic receiver and the metric values over a long time period and then build a histogram of the detection failure rate vs. the metric value with the histogram bins defined over the range of metric values. Then, for the desired detection failure rate (say 10%) determine the mean value of the metric—i.e. determine in which metric value bin the desired detection failure rate is achieved. Use this value of the metric for your threshold (or back it off a bit by multiplying by a factor such as 0.9).

The same process can be performed for multiple times and take the resulting threshold and put it through a filter that effectively averages the threshold over a longer time.

Alternatively, rather than collecting many different observations over a long time, the threshold can be updated by a small amount at every observation. For each initial transmission the pass/fail result will be observed and the value of the calculated metric. If the metric is above the threshold but the detection failed the threshold will be moved down a very small amount. If the metric is below the threshold but the detection passed the threshold can be moved up a very small amount. This process can be repeated over many observations and over time the threshold converges to the desired value. This process provides a feedback loop that moves the threshold to the desired value over time.

The training mode can be run in parallel with the normal reception or it could be run independently. Once the thresholds have been determined the measurement dependent receiver processing metric can utilize the thresholds to determine when the advanced receiver should be enabled.

The device and methods according to the present disclosure may be implemented by any hardware, software or a combination of hardware and software having the above described functions. The software code, either in its entirety or a part thereof, may be stored in a computer-readable memory. Further, a computer data program representing the software code may be embodied on a computer-readable memory. Although the receiver is described in terms of units, the functions of the receiver may be integrated in to other components of the wireless mobile device such as the receiver, decoder or radio processors.

While a particular embodiment of the present device and methods for state dependent advanced receiver processing in a wireless mobile device has been described herein, it will be appreciated by those skilled in the art that changes and modifications may be made thereto without departing from the disclosure in its broadest aspects and as set forth in the following claims.

The invention claimed is:

1. A method for receiver processing in a wireless mobile device, the method comprising:
    determining a radio frequency (RF) performance metric value for a signalling channel indicating the likelihood that a handover of the wireless mobile device will be requested by a network;
    determining a threshold value for the metric value, the threshold value for determining when an advanced receiver of the wireless mobile device should be enabled due to the likelihood of a basic receiver of the wireless mobile device failing to decode a received sub-frame, the advanced receiver providing advanced decoding algorithms compared to the basic receiver;
    comparing the metric value to the threshold value;
    enabling the advanced receiver when the metric value is less than the threshold value to receive and process sub-frames; and
    enabling the basic receiver when a handoff message is received from the network or the metric value is greater than the threshold value.

2. The method of claim 1 further comprising:
    with the basic receiver enabled, receiving an initial sub-frame transmitted from a base station on the signalling channel, the sub-frame received using the basic receiver in the wireless mobile device;
    performing an integrity check on the initial sub-frame to determine if the sub-frame was demodulated and decoded correctly by the basic receiver;
    in the event of the integrity check failing and a hybrid-acknowledgement request (HARQ) negative acknowledgement (NAK) being sent to the base station by the wireless mobile device, enabling the advanced receiver prior to an expected retransmission sub-frame;
    receiving the retransmission sub-frame transmitted from the base station using the advanced receiver;
    performing an integrity check on the retransmission sub-frame to determine if the retransmission sub-frame was demodulated and decoded correctly by the advanced receiver; and
    if the basic receiver is not enabled, enabling the basic receiver when the integrity check of the retransmission sub-frame passes and an HARQ ACK is sent to the base station by the wireless mobile device or a new data indicator (NDI) is set in a control channel indicating that the transmission is an initial transmission.

3. The method of claim 2, wherein the advanced receiver is enabled to determine if the NDI is set in the control channel when an HARQ NAK is sent and prior to receiving the retransmission sub-frame.

4. The method of claim 1, wherein the metric value is determined as a ratio of a reference signal received power (RSRP) of a serving base station and the RSRP of a neighboring base station.

5. The method of claim 1, wherein the metric value is determined as a ratio of a reference signal received quality (RSRQ) of a serving base station and the RSRQ of a neighboring base station.

6. The method of claim 1, further comprising determining at least one channel parameter of the signalling channel, each of the at least one channel parameter associated with a threshold from a plurality of thresholds.

7. The method of claim 6, wherein the at least one channel parameter is selected from a group comprising: one or more of transmission mode, system bandwidth, mobile speed, and receiver implementation.

8. The method of claim 6, wherein the determining the threshold value further comprises performing a lookup of the threshold value in a table stored in a memory of the wireless mobile device, the table containing one or more threshold values, each threshold value associated with at least one set of the at least one channel parameter.

9. The method of claim 1, further comprising entering a training mode to determine one or more thresholds to be used by the wireless mobile device, the training mode comprising:
    receiving a sub-frame using the basic receiver;
    determining an integrity check result on the initial sub-frame to determine if sub-frame was demodulated and decoded correctly by the basic receiver;
    determining a metric value for the channel;
    determining a threshold value for the metric value and integrity check result, the threshold value for determining when the advanced receiver should be enabled due to the likelihood of the basic receiver failing to decode the received sub-frame; and
    storing the determined threshold value;
    wherein the advanced receiver is disabled when the training mode is active or the training mode is disabled when the advanced receiver is enabled.

10. The method of claim 1, further comprising entering a training mode to determine one or more thresholds to be used by the wireless mobile device, the training mode comprising:
    receiving a sub-frame using the basic receiver;
    performing an integrity check on the initial sub-frame to determine an integrity check result identifying if the initial sub-frame was demodulated and decoded correctly by the basic receiver;
    determining at least one channel parameter of the received signal from the base station;

determining a metric value for the channel;
retrieving a threshold value for the determined at least one channel parameter, the threshold value for determining when the advanced receiver should be enabled due to the likelihood of the basic receiver failing to decode the received sub-frame associated with the metric value; and
updating the retrieved threshold value based upon the determined metric value for the at least one channel parameter and the integrity check result;
wherein the advanced receiver is disabled when the training mode is active or the training mode is disabled when the advanced receiver is enabled.

11. The method of claim 10, wherein updating the retrieved threshold value further comprises:
collecting observations of both a number of failed initial transmission detections for the basic receiver and the metric values over a defined time period;
building a histogram of the detection failure rate versus the metric value, wherein histogram bins are defined over the range of the metric values;
determining in which metric value bin of the histogram the desired detection failure rate is achieved; and
updating the threshold value to be equal to the determined metric value.

12. The method of claim 11, wherein updating the retrieved threshold value is performed incrementally for each determination of the metric value, wherein if the metric value is above the threshold value but the integrity check failed the threshold value will be incrementally decreased, and if the metric value is below the threshold value but the integrity check passed the threshold value can be incrementally increased, wherein the threshold value can be adjusted by repeating the process over many observations and over time the threshold value converges to a desired value.

13. The method of claim 1, wherein the advanced receiver uses receiver algorithms of greater complexity in comparison to the basic receiver, the advanced receiver consuming more battery resources in comparison to the basic receiver.

14. The method of claim 13, where the advanced receiver uses a greater number of reference signals to determine the signalling channel to provide a better estimate particularly at low speeds and when the signalling channel has a high coherence bandwidth.

15. The method of claim 13, wherein the advanced receiver implements interference cancellation to remove unwanted inter-cell interference.

16. The method of claim 13, wherein the advanced receiver is optimized for low signal-to-noise-ratio (SNR) reception.

17. A state dependent receiver processing chain for use in a wireless mobile device, the state dependent receiver processing chain comprising:
a basic receiver;
an advanced receiver for providing advanced decoding algorithms compared to the basic receiver;
a metric computation unit for determining a radio frequency (RF) performance metric value for a signalling channel indicating the likelihood that a handover of the wireless mobile device will be requested by a network; and
a decision unit configured to determine a threshold value for the metric value, the threshold value for determining when the advanced receiver should be enabled due to the likelihood of the basic receiver failing to decode a received sub-frame and further configured to compare the metric value to the threshold value,
wherein the decision unit enables the advanced receiver when the metric value is less than the threshold value and initial sub-frames are received using the advanced receiver until a handoff message is received from the network or the metric value is greater than the threshold value.

18. The state dependent receiver processing chain of claim 17, further comprising:
an integrity check unit configured to perform an integrity check on an initial sub-frame transmitted to the wireless mobile device from a base station and received using the basic receiver, to determine if the initial sub-frame was demodulated and decoded correctly by the basic receiver; and
a decision unit for enabling the advanced receiver in the event of the integrity check failing and a hybrid-acknowledgement request (HARQ) negative acknowledgement (NAK) being sent to the base station by the wireless mobile device, such that the advanced receiver is enabled prior to receiving an expected retransmission sub-frame,
the integrity check unit being further configured to perform an integrity check on the retransmission sub-frame to determine if the retransmission sub-frame was demodulated and decoded correctly by the advanced receiver,
the decision unit being further configured to enable the basic receiver, if the basic receiver is not enabled, when the integrity check of the retransmission sub-frame passes and an HARQ acknowledgement (ACK) is sent to the base station by the wireless mobile device or a new data indicator (NDI) is set in a control channel indicating that the transmission is an initial transmission.

19. The state dependent receiver processing chain of claim 17, further comprising:
a training unit providing a training mode for:
receiving an integrity check result based upon a received initial sub-frame to determine if the sub-frame was demodulated and decoded correctly by the basic receiver;
determining at least one channel parameter of the received signal from the base station;
determining a metric value for the channel;
determining a threshold value for the metric value and integrity check result, the threshold value for determining when the advanced receiver should be enabled due to the likelihood of the basic receiver failing to decode the received sub-frame; and
storing the determined threshold value;
wherein the advanced receiver is disabled when the training mode is active.

20. The state dependent receiver processing chain of claim 17, further comprising a table stored in memory containing one or more threshold values, each threshold value associated with at least one set of the at least one channel parameter.

21. The state dependent receiver processing chain of claim 17, wherein the metric value is determined as a ratio of a reference signal received power (RSRP) of a serving base station and the RSRP of a neighboring base station or the metric value is determined as a ratio of a reference signal received quality (RSRQ) of a serving base station and the RSRQ of a neighboring base station.

* * * * *

UNITED STATES PATENT AND TRADEMARK OFFICE
CERTIFICATE OF CORRECTION

| | | |
|---|---|---|
| PATENT NO. | : 8,429,475 B2 | |
| APPLICATION NO. | : 12/714050 | |
| DATED | : April 23, 2013 | |
| INVENTOR(S) | : Jason Robert Duggan | |

It is certified that error appears in the above-identified patent and that said Letters Patent is hereby corrected as shown below:

In the Claims

In column 17, claim 12, lines 28 to 30, "...but the integrity check failed the threshold value will be incrementally decreased, and if the metric value is below the threshold value but the integrity check passed the...", should be --...but the integrity check failed, the threshold value will be incrementally decreased, and if the metric value is below the threshold value but the integrity check passed, the...--.

Signed and Sealed this
Eighteenth Day of June, 2013

Teresa Stanek Rea
*Acting Director of the United States Patent and Trademark Office*